Feb. 15, 1949. W. H. McLELLAND ET AL 2,461,561
SADIRON ASSEMBLY
Filed May 17, 1944 2 Sheets-Sheet 1

Inventors
William H. McLelland
Eric J. Ajax
By Paul, Paul & Moore
Attorneys

Feb. 15, 1949. W. H. McLELLAND ET AL 2,461,561
SADIRON ASSEMBLY
Filed May 17, 1944 — 2 Sheets-Sheet 2
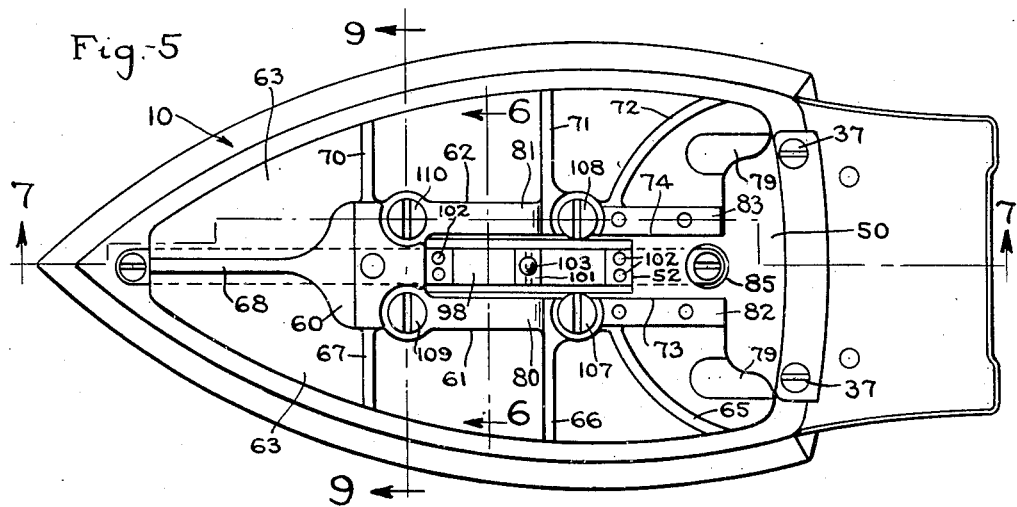
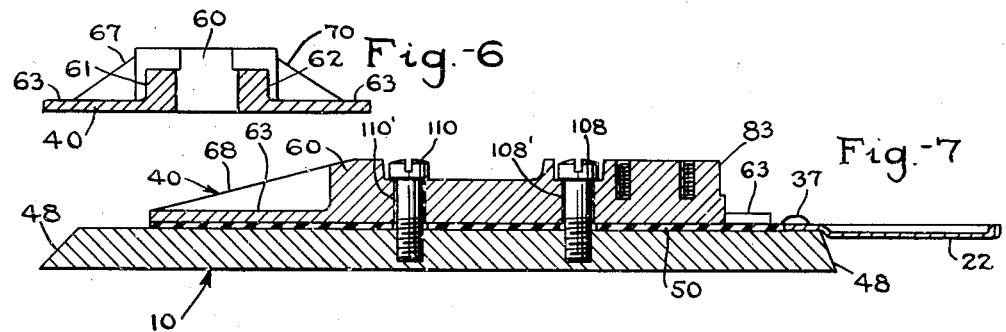
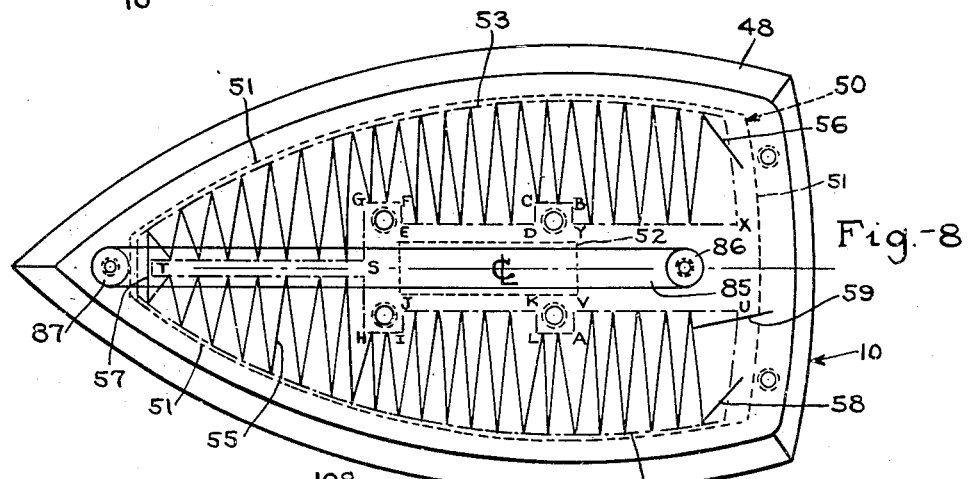
Inventors
William H. McLelland
Eric J. Ajax
By Paul, Paul + Moore
Attorneys.

Patented Feb. 15, 1949

2,461,561

UNITED STATES PATENT OFFICE 2,461,561

SADIRON ASSEMBLY

William H. McLelland, Mansfield, Ohio, and Eric J. Ajax, Minneapolis, Minn., assignors, by mesne assignments, to Argus, Incorporated, Ann Arbor, Mich., a corporation of Michigan Application May 17, 1944, Serial No. 535,919

2 Claims. (Cl. 219—25)

This invention relates to electric irons and more particularly to a sole plate, heater and pressure plate sub-assembly of such apparatus. In accordance with the usual construction of electric irons there is provided a sole plate of usual contour which is heated by an electric heating element. In order to provide for the uniform and efficient conduction of heat from the electrical resistance element to the sole plate, a clamping apparatus is usually provided. Such constructions have not, however, proven entirely satisfactory and as a result the sole plate has not been heated uniformly nor efficiently.

It is an object of the invention to overcome the difficulties of prior electric iron constructions and to provide for uniform and efficient conduction of heat from the electrical heat resistant element to the sole plate. It is a further object of the invention to provide a sole plate heater and a pressure plate sub-assembly of an electric iron wherein the heating element is maintained in uniform mechanical contact and in good heat conductive relation with the sole plate, throughout the life of the electric iron. It is a further object of the invention to provide a sole plate heater element and pressure plate assembly wherein the sole plate and pressure plate are of dissimilar materials having dissimilar coefficients of heat expansion, and in such an apparatus to provide an improved construction wherein the heating element is maintained under uniform pressure in mechanical contact with the sole plate. It is a further object of the invention to provide a self-contained electric iron sub-assembly of sole plate, heating element and pressure plate and including in such an arrangement elements having dissimilar coefficients of heat expansion.

Other and further objects of the invention are those inherent in the apparatus hereinafter illustrated, described and claimed.

The invention is illustrated with reference to the drawings in which

Figure 5 is a plan view of the sole plate heating element and pressure plate sub-assembly of Figure 4;

Figure 6 is a cross sectional view of the pressure plate only, taken in the direction of arrows 6—6 of Figure 5;

Figure 7 is a vertical sectional view of the apparatus of Figure 5, taken in the direction of arrows 7—7 of Figure 5;

Figure 8 is a plan view of the sole plate and heating element, including the insulating foils and heating panels of said element, being illustrated by dotted lines and fine lines; and Figure 9 is a cross sectional view taken in the direction of arrows 9—9 of Figure 5.

Figure 1:
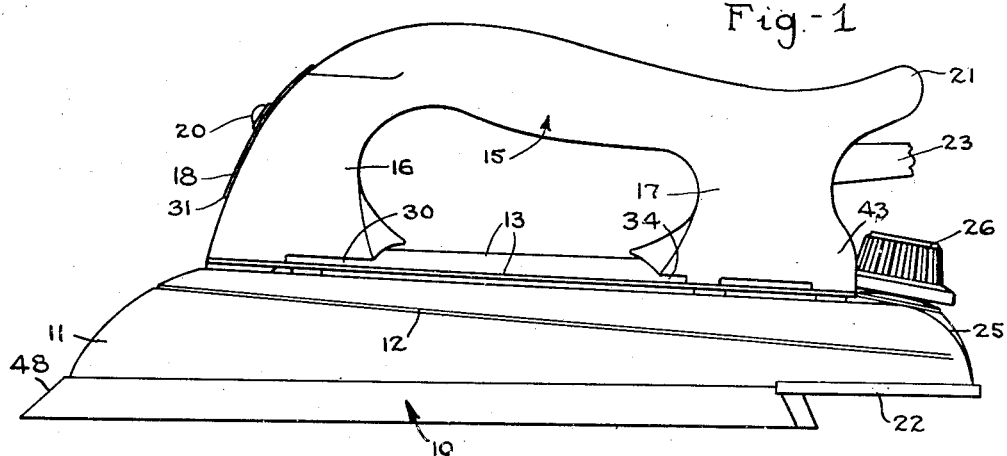
Figure 1 is a side elevational view of the electric iron of the invention.

Referring to the drawings, the electric iron of the present invention is illustrated in Figure 1 where 10 generally designates the sole plate. Upon the sole plate there is mounted an outer shell 11 provided with a decorative rib 12 for artistic and reinforcement purposes. Upon the shell 11 there is mounted a shield plate 13 which serves, as hereinafter illustrated, as a mounting plate for the terminal block, signal lamp, and handle of the apparatus. Superimposed upon and attached to the shield and to the shell there is provided a handle generally designated 15 having a front support portion 16 and a rear support portion 17 attached to the base of the iron. The handle is provided with a front shield 18 in which an indicator lamp lens 20 is mounted. The rear portion of the handle is provided with a tip 21 which with the skirt 22 mounted on the sole plate serves as a steady rest when the iron is tilted backwards. An electrical cord 23 is connected to the rear post 17 of the handle and upon the rear portion 25 of the shell there is mounted a control knob 26 for regulation of the combined thermostatic control and on-and-off switch of the iron.

The novel features of design and construction of the handle, shield, shell and thermostatic control together with other features of the upper iron construction form no part of the present invention, and reference is therefore only briefly made to them herein for explanatory purposes. Such novel features of the invention are claimed in our copending applications entitled "Electric iron assembly," Ser. No. 535,920, "Electric iron," Ser. No. 535,918, and design for "Electric irons," Ser. No. D–113,630, now Patent Des. 139,040, filed of even date herewith.

Figure 2:
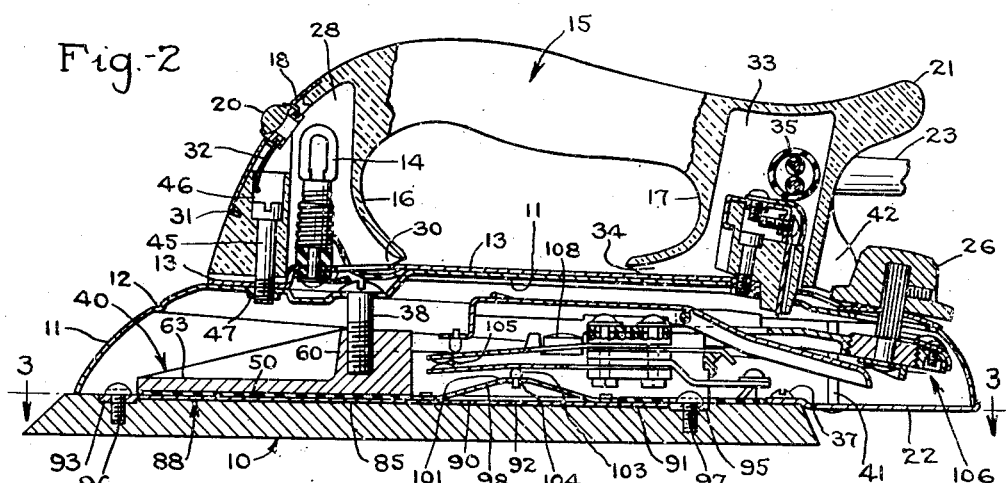
Figure 2 is a side elevational view, portions of the iron being shown in section along the longitudinal center line of the iron.

Referring to Figure 2 the front portion 16 of the handle is cored out so as to provide a hollow space 28 which is open at the bottom 30 when the handle is removed. Access may also be had to the interior space 28 by removal of the shield 18 which is fastened in place by the in-turned tip 31 and the retaining spring 32. The rear portion 17 of the handle is also provided with an interior open space 33 to which access may likewise be had through the open bottom 34 when the handle is removed. The electrical connection to the iron extends through the right rear portion of the handle 15, as illustrated in Figures 1 and 2, wherein the electrical connection 23 is illustrated as entering the interior space 33 at opening 35. The skirt 22 of the iron is fastened to the sole plate by a pair of screws 37 and the shell 11 is fastened by a single large retaining screw 38 which extends through the shell into the pressure plate generally designated 40, to be described in greater detail hereinafter. The shield 13 is positioned between the handle and the shell, the rear portion of the handle being fastened to the shell by a pair of screws 41, one at each side of the iron extending through the skirt portion 22 of the iron into the bosses 42 and 43 at the rear lateral portions of the back handle support 17. The front of handle 15 is attached in place and hence assists in holding the shield 13 in place upon the shell 11, the front attachment of the handle being by means of a screw 45 which extends from the screw recess 46 of the handle into a threaded opening 47 in the front portion of the shell. Access to the screw 45 may be had when the cover plate 18 is removed from the handle.

Referring to Figures 3 through 9, there is illustrated a sole plate, heater pad and pressure plate sub-assembly of the iron. As illustrated in these figures, the sole plate 10 has a peripheral contour, as illustrated in Figure 8, being chamfered at the edge, as illustrated at 48. The sole plate is preferably made of aluminum or aluminum alloy and may, if desired, be chromium plated or otherwise plated for decorative purposes, as well as to present a smooth, mirror-like ironing surface. Upon the sole plate there is positioned a flat panel type electrical heating element assembly generally designated 50, the outer contour of which is illustrated by the dotted lines. The heating element is composed of an upper and lower panel of electrical insulating material, preferably mica, having the contour shown by the dotted line 51, Figure 8. Two such insulating panels are utilized and each is cut out in the center, as indicated by the dotted line 52. Between the top and bottom insulating panels of the heating element there is positioned another panel 53 of insulating material, preferably mica, the contour of which is illustrated by the dot and dash lines, it being noted that this foil is cut away along the rear central portion so as to present at least a central area defined by the lines A—B, B—C, C—D, D—E, E—F, F—G, G—H, H—I, I—J, J—K, K—L, L—A. The panel 53 is also preferably cut away along the lines U—V and X—Y, and a strip cut out from S to T so as almost to divide the panel. This is for convenience in winding the heater wire 55 on the panel. However, it is to be emphasized that the area defined by the lines A—B through L—A is located centrally of the sole plate and is relatively small in area as compared to the total area of the sole plate 10. The insulating foil 53 which is preferably of thin mica serves as an element on which the electrical heating wire is wound as indicated by the line 55. The electric resistance wire 55 extends from one terminal extension 56 and then is wound on the portion of panel 53 which is above the center line, as shown in Figure 8, and then extends across at 57 to the lower half of the panel 53 below a center line of Figure 8, the contour of the two halves making up panel 53 being indicated by the dot and dash line. The second terminal extension of the heater is indicated at 58. If desired, a third connection may be brought out at 59 to serve as a connection to the pilot lamp 14. It will thus be observed that the electric resistance wire in the heating element neatly encompasses the central area defined by the lines A—B through L—A, heretofore defined.

The pressure plate generally designated 40 consists of a thickened center land 60 which extends crosswise of the iron from the line 61 to the line 62. Outside of this thickened center portion of the pressure plate, the pressure plate is relatively much thinner, as indicated at 63, but is reinforced by stiffening webs 65, 66, 67, 68, 70, 71 and 72 extending outwardly from the thickened center land 60 and tapering down to the edge of the pressure plate, as illustrated in Figures 6, 7 and 9. The thickened center land 60 is slotted from the rear to about the middle, between the lines 73 and 74, the base of the pressure plate being entirely cut through between these lines 73 and 74. As a result there are presented two symmetrical lands 80 and 81 extending backwardly from the front to the rear end of the pressure plate terminating at 82 and 83. The pressure plate is shaped at 78—79 and also apertured at 85 for clearance purposes, as hereinafter indicated.

Figure 3:
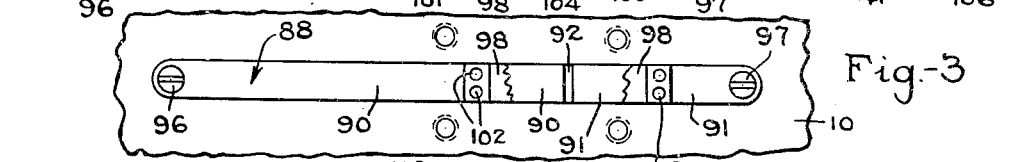
Figure 3 is a fragmentary plan view of the center line portion of the sole plate taken in the direction of arrows 3—3 of Figure 2.
Figure 4:
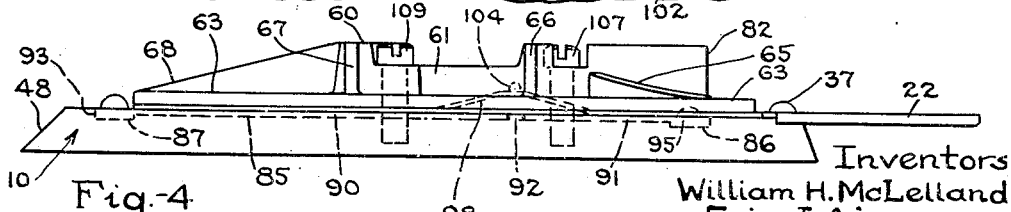
Figure 4 is a side view of the sole plate, heating element and pressure plate sub-assembly.

Referring to Figures 3, 4 and 8 the upper portion of the sole plate 10 is milled out so as to present a slot 85, the ends of the slot being rounded at the end and deepened at 86 and 87. In the slot there is positioned a metal strip generally designated 88 which is made up of two parts 90 and 91 separated by a gap 92. The strip has a width and thickness such that it neatly fits in a slot 85 in the sole plate. At the outer ends of the strip pieces 90 and 91 and to the bottom surface there are attached two circular washers 93 and 95 respectively, which are preferably welded in place so as to constitute a unitary part of the strips 90 and 91, respectively. The washers 93 and 95 are of such size as neatly to fit into the depressions 87 and 86 respectively in the sole plate. The extreme ends of the strips 90 and 91 are attached to the sole plate by screws 96 and 97 respectively which are threaded into the sole plate, the endwise strains on the strip being taken on the washers. The two strips 90 and 91 are of metal dissimilar from the metal of the sole plate 10 and such as to have a relatively much lower coefficient of expansion. The strips 90 and 91 may be made of steel, but are preferably made of Invar, whereas the sole plate is preferably made of aluminum or aluminum alloy and consequently has a much larger coefficient of expansion than the strip. The gap 92 between the two strips 90 and 91 is bridged by a strip 98 which is bent upwardly in its middle portion 101. The two ends of the strip 98 are riveted or otherwise fastened at 102 to the strips 90 and 91 respectively. The center portion 101 of the strip 98 is provided with an insulating button 103 which extends through a small hole 104 in the center of the strip 98. Accordingly where the sole plate has a greater coefficient of expansion than the combined assembly composed of strips 90, 98 and 91, when the sole plate is expanded due to heating, the strips 90 and 91 are pulled away from each other at the gap 92 and as a result the coupling strip 98 is drawn down, thereby permitting the insulating button 103 also to be drawn down. This expansion serves to control contacts generally designated 105 and opens and closes the circuit through the electrical heating element generally designated 50. The construction of the contacts 105 and their control arrangements generally indicated at 106 constitutes the subject matter of my copending application entitled "Electric iron," Ser. No. 535,913, filed of even date herewith and will not be further described herein except to state that by operation of the knob 26, contacts 105 may be controlled so as entirely to disconnect the heater element 50 from the electrical cord 23 or by other suitable adjustment the contacts 105 can be caused to open and close so as to maintain any desired operating temperature at the sole plate 10.

The pressure plate 40 is preferably made of iron and hence has a different coefficient of expansion than the sole plate 10 which is preferably made of aluminum or aluminum alloy, and as a result a certain creepage occurs between the pressure plate and the sole plate due to variations in temperature of the unit. The attachment of the pressure plate 40 to the sole plate is accomplished by a plurality of screws, four screws 107, 108, 109 and 110 being shown in the illustrated embodiments. The screws 107—110 all pass through the central area defined by the lines A—B through L—A, heretofore described, and since this area is relatively small as compared to the total dimensions of the sole plate and pressure plate, the amount of creepage between the screws is minimized. The holes in the pressure plate through which the screws 107—110 pass are of a size such as to provide slight clearance such as illustrated at 110' and 108' in Figure 7.

In fabricating the sub-assembly shown in Figures 3 through 9, the thermostat control switch 80 is placed on the sole plate and is fastened by means of screws 96 and 97, and the heating element 50 is then located on the sole plate with the central aperture 52 through the heating element insulating foils located so that the center bent strip 98 of the control 80 extends upwardly therethrough. The pressure plate, which is coextensive in outer peripheral dimension with the heating element assembly 50, is then placed upon the heating element and the screws 108—110 inserted and pulled down tightly. As a result the heating element 50 is tightly clamped between the pressure plate 40 and the sole plate 10.

Thereafter, during operation of the iron the sole plate and pressure plate are heated to varying temperatures, and being of dissimilar metals creepage occurs between adjacent portions of the pressure plate and sole plate. Throughout the relatively small central area defined by the lines A—B through L—A, heretofore described, the creepage is relatively small due to the smallness of the area involved, but at the extreme edges of the pressure plate a relatively large creepage occurs. However, due to the central attachment of the pressure plate to the sole plate by means of screws 107—110 the creepage does not have any loosening effect, and as a result the heating element 50 is maintained in tightly clamped relationship throughout the life of the iron.

It is obvious that less than four screws or more than four screws may be utilized for the attachment of the sole plate to the pressure plate or attachment means such as rivets or other mechanical fastening devices may be utilized, provided however that the area in which such attachment of the pressure plate and sole plate is made is kept at a minimum and located in the central portion of the pressure plate and sole plate. When this is done the heating element is maintained in uniform tightly clamped relationship throughout the life of the iron.

As many apparently widely different embodiments of this invention may be made without departing from the spirit and scope thereof, it is to be understood that we do not limit ourselves to the specific embodiments herein except as defined by the appended claims.

What we claim is:

1. An electric iron sub-assembly comprising a sole plate, a flat, insulated electric heating element positioned on and overlying the sole plate, a pressure plate overlying the heating element, said pressure plate comprising a relatively thin flat base portion having an elongated narrow longitudinal aperture through the center portion thereof, said pressure plate having heavy walls integral with the base portion immediately adjacent each side of said longitudinal aperture, stiffening webs integral with the walls and base portion extending radially from the walls to the edges of the thin flat base portion, fastening means extending downwardly through the walls into the sole plate near the central portion of said sole plate for holding the pressure plate in clamping relation on the heating element, and a thermostatic element and switch contacts operated thereby located between said walls in alignment with said aperture.

2. An electric iron sub-assembly comprising a sole plate, a flat, insulated electric heating element positioned on and overlying the sole plate, a pressure plate overlying the heating element, said pressure plate comprising a relatively thin flat base portion having an elongated narrow longitudinal aperture through the center portion thereof, said pressure plate having a heavy continuous upstanding wall extending along each side of the said longitudinal aperture and around the front thereof and stiffening webs integral with the wall, and base portion extending radially from the walls to the edges of the thin flat base portion, fastening means extending downwardly through the walls into the sole plate near the central portion of said sole plate for holding the pressure plate in clamping relation on the heating element, and a thermostatic element and switch contacts operated thereby between said walls in alignment with said aperture.

WILLIAM H. McLELLAND.
ERIC J. AJAX.

REFERENCES CITED

The following references are of record in the file of this patent:

UNITED STATES PATENTS

| Number | Name | Date |
|---|---|---|
| 1,212,082 | Manzella | Jan. 9, 1917 |
| 1,469,727 | Jermin | Oct. 2, 1923 |
| 1,491,363 | Spencer | Apr. 22, 1924 |
| 1,606,037 | Myers | Nov. 9, 1926 |
| 1,615,464 | Marsden | Jan. 25, 1927 |
| 1,840,652 | Bell | Jan. 12, 1932 |
| 1,940,731 | Ross | Dec. 26, 1933 |
| 1,975,736 | Vaughan | Oct. 2, 1934 |
| 2,052,662 | Roehl et al. | Sept. 1, 1936 |
| 2,154,042 | Gough | Apr. 11, 1939 |
| 2,184,270 | Campbell | Dec. 26, 1939 |
| 2,201,115 | Reingruber et al. | May 14, 1940 |
| 2,274,390 | Weeks | Feb. 24, 1942 |
| 2,296,591 | Barnes | Sept. 22, 1942 |